United States Patent Office

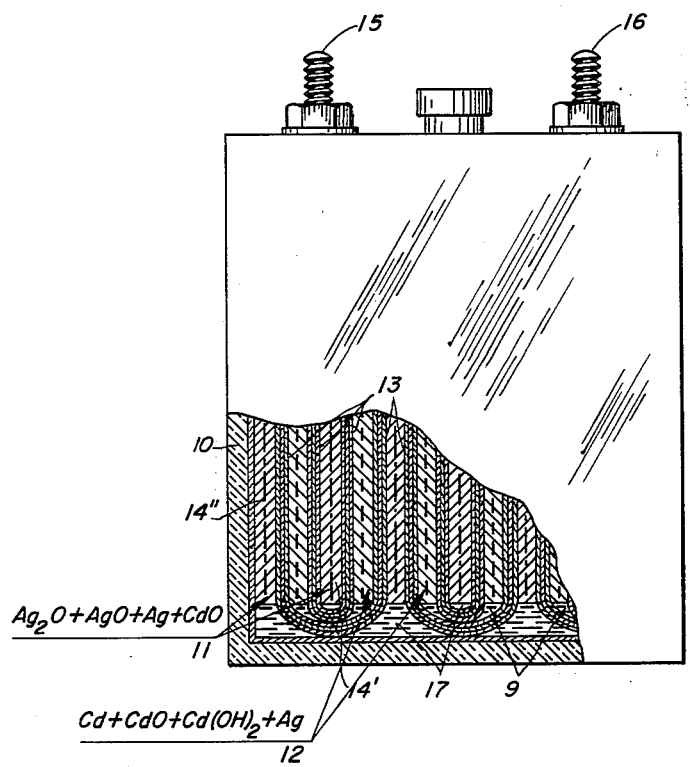

3,104,990
Patented Sept. 24, 1963

3,104,990
ELECTRODES CONTAINING SILVER AND CADMIUM COMPOUNDS
Frank Solomon, Lake Success, N.Y., and Robert F. Enters, Hackensack, N.J., assignors to Yardney International Corp., New York, N.Y., a corporation of New York
Filed May 24, 1960, Ser. No. 31,472
8 Claims. (Cl. 136—20)

The present invention relates to electrochemical batteries. More particularly, the invention relates to batteries of the silver-cadmium type as disclosed in our copending application Ser. No. 695,160, now Patent 2,994,729, filed November 7, 1957, and 530,355, filed August 24, 1955, now abandoned, of which the present application is a continuation-in-part.

The formation of gas during the cycles of operation (i.e. charging and discharging) of electrochemical batteries is frequently objectionable, especially in sealed cells which may rupture because of gas pressure. Even where it is feasible to provide an outlet for the evolved gases, however, the release of explosion-prone gases such as hydrogen and/or oxygen may be highly undesirable.

Accordingly, it is a primary object of this invention to provide an electrode for an electrochemical battery which is capable of delaying or preventing hydrogen and/or oxygen evolution.

A more specific object of our invention is to provide means for minimizing gassing in a cell or battery which utilizes the advantages of compactness, great mechanical stability and high ratio of storage capacity to weight inherent in silver-cadmium cells of the type particularly disclosed in our copending application.

It is another object of the invention to provide an ambipolar electrode for an electrochemical battery, especially a silver-cadmium battery, i.e. one which can function as either a negative or a positive plate.

Generally, the objects of the invention are accomplished by the provision of an electrode comprising a mixture of silver and cadmium as its active material, at least the cadmium being generally present in a state of partial or complete oxidation.

The particular amounts of component materials necessary to prevent the evolution of hydrogen and/or oxygen can vary widely in electrodes manufactured in accordance with the instant invention. Furthermore, the relative proportions of their principal components will determine whether it shall preferentially be used as a positive or a negative plate, either type of use being possible if the silver and the cadmium are present in approximately equal amounts. Generally, as little as 1% and as much as 99% of silver or cadmium by weight, based on the total weight of the active mass, can be employed in making an electrode. Preferably, however, an electrode according to the invention which is to be used as the positive plate should comprise from 70% to 90% of silver and from 10% to 30% of cadmium, by weight, whereas for a negative plate the optimum proportions range from 90% to 98% for the cadmium and from 10% to 2% for the silver, based on the total weight of the active mass.

In originally constituting an electrode in accordance with this invention, the silver is preferably employed in the pure metallic state although the oxide can be used; the other major component will generally be in the form of cadmium and/or its oxide or hydroxide, though other cadmium salts such as its sulfate, nitrate, chloride, acetate, or other inorganic or organic compounds soluble in water can be utilized. Cadmium sulfate is among the preferred salts since the sulfate ion is useful in inhibiting silver penetration of semi-permeable sheet separators (e.g. of regenerated cellulose) which are conventionally used in the cell. If both materials are originally in their metallic state, anodic oxidation will convert the cadmium to its oxide and/or hydroxide before the silver begins to oxidize. If, on the other hand, both components are originally in the form of oxides or other compounds, the silver will be reduced while the cadmium is still in its oxidized state when the plate is connected cathodically. At the end of a normal discharge, therefore, a positive silver electrode according to the invention will still contain a reducible component (i.e. cadmium oxide) which will prevent gassing at that electrode upon continued discharge; a negative cadmium oxide electrode according to the invention will similarly contain, at such time, an oxidizable component (silver) adapted to prevent gassing thereat on further discharge. Such further discharge beyond its usual termination may occur, for example, in a cell series-connected with one or more cells of higher capacity in an accumulator, or if some other external electromotive force is present.

The electrodes of this invention may be manufactured by blending and compacting the comminuted components in the desired proportions. If the silver is present in a minimum quantity of about one third of the total active materials, it may be convenient to sinter the mixture or to impregnate a presintered silver skeleton with an aqueous solution of a cadmium salt and then hydrolyze the salt as more fully disclosed in the copending application Ser. No. 31,276, filed concurrently herewith by Albert Himy and assigned to the owner of the instant application.

The sole FIGURE of the accompanying drawing is an elevational view (parts broken away) of an electrochemical battery embodying our invention.

The battery shown in the drawing embodying the electrodes of this invention comprises a casing 10, a plurality of positive electrodes 11, a plurality of negative electrodes 12 alternating with the positive electrodes, and layers 13 of porous and/or semi-permeable separator material between adjacent electrodes of opposite polarities. The electrode assembly 11, 12, 13 is permeated by an alkaline electrolyte 17, such as a 30% to 50% aqueous potassium-hydroxide solution, which is confined by the separators 13 in positive and negative electrolyte compartments surrounding the respective electrodes.

The positive electrodes 11 may initially consist, essentially, of sintered silver and a minor amount of a cadmium compound, for example cadmium oxide prepared in the following manner: 960 grams of silver in finely powdered form are mixed with 40 grams of cadmium oxide and agitated until the mixture is uniform. The mixture is then placed in a die cavity and a current-collecting member in the form of a silver grid, wire loop or the like, indicated in the drawing by dotted lines 14', is inserted in the mixture. The collector 14' has a terminal lead (not shown) extending from it towards positive terminal 16 as is well known. The entire mass is then compressed at pressures varying between approximately 0.75 and 3 tons per cm.². The resulting plate 11 is then placed in the casing 10 as part of the electrode assembly shown in the drawing and is charged prior to use whereby substantially all of the silver is converted to its oxide and/or peroxide.

The negative electrodes 12 shown in the drawing are rectangular plates of compacted comminuted material which may be prepared as follows: 950 grams of cadmium oxide in finely powdered form are mixed with 50 grams of silver powder until the latter is uniformly distributed throughout the cadmium-oxide mass. The mixture is then placed in a die cavity and a current-collecting member 14″ is inserted in the mixture. The collector 14″ has a terminal lead (not shown) extending from it towards negative terminal 15. The entire mass is then compressed at pressures again ranging between approximately 0.75 and 3 tons per cm.². The resulting plate 12 is then placed in the casing 10' as part of the electrode assembly shown in the drawing and is charged prior to use whereby the cadmium oxide is at least partially reduced to metallic cadmium.

The separator layers 13 may include semi-permeable sheets of cellulosic or thermoplastic material, such as regenerated cellulose or polyvinyl alcohol, and may have advantageously incorporated therein an ion exchanger for the purpose of reducing their apparent electrical resistance and increasing their ability to repel silver ions and to resist penetration thereby.

To avoid gassing on overcharge, the amounts of cadmium oxide in each negative electrode should exceed the equivalent amount of silver in each positive plate 11.

A cell containing the electrodes prepared in the manner described above did not evolve any hydrogen or oxygen under prolonged use on either overcharge or extended discharge. Similar results were obtained with different proportions of the principal components, including the case of approximate parity of silver and cadmium in the plates of both polarities.

Electrodes coming within the scope of this invention, regardless of the process by which they are manufactured, present many advantages. For example, not only do such electrodes prevent or delay hydrogen and/or oxygen evolution as pointed out hereinabove, but they also do not undergo premature deterioration. Furthermore, as constituted in accordance with this invention the electrodes retain a high degree of mechanical stability and electrical conductivity even when the active mass is fully or almost fully discharged.

Numerous variations and modifications of the invention herein described can be made without departing from the spirit and scope thereof, and, accordingly, the same is not to be limited to the specific embodiments disclosed herein except as defined in the appended claims. These claims are specifically directed to electrodes including a preponderance of silver-containing material, thus to positive electrodes with silver as the active material and cadmium as the antipolar mass; a negative electrode with cadmium as the active material and silver as the antipolar mass, as described above, has been claimed in our earlier Patent No. 2,994,729, issued August 1, 1961.

We claim:

1. An electrode for electrochemical batteries, comprising a compacted comminuted mass composed to an extent of not less than substantially 70%, by weight, of an active material selected from the group which consists of silver and silver oxides, said mass further containing a cadmium compound selected from the group consisting of cadmium salts, cadmium hydroxides and cadmium oxides, said cadmium compound being present in an amount ranging between substantially 1% and 30%, by weight, of said mass.

2. An electrode according to claim 1, wherein said active material is present in an amount ranging between substantially 70% and 90% of said mass.

3. An electrode according to claim 2 wherein said cadmium compound is present in the range of about 10% to 30% by weight.

4. An electrode according to claim 1 wherein the cadmium material is cadmium oxide.

5. An electrochemical cell comprising a positive electrode with a silver-containing active material and a negative electrode with an active material more electronegative than silver, said positive electrode containing comminuted silver material to an extent not less than substantially 70% by weight and from 1% to 30% by weight of a cadmium compound selected from the group consisting of cadmium salts, cadmium hydroxide and cadmium oxides.

6. A cell according to claim 5 wherein the active material of said negative electrode is cadmium.

7. An electrochemical battery comprising at least one positive electrode, at least one negative electrode, an alkaline electrolyte surrounding said electrode, and semi-permeable separator means confining said electrolyte in separate compartments respectively enclosing said positive and said negative electrode, said positive electrode including a mixture of a comminuted silver material selected from the group consisting of silver and silver oxides and a cadmium material selected from the group consisting of cadmium salts, cadmium oxides and cadmium hydroxides, said silver material constituting not less than substantially 70% by weight of said positive electrode and said cadmium material constituting from about 1% to 30% by weight of said positive electrode.

8. A battery according to claim 7, wherein said negative electrode is a cadmium-containing electrode.

References Cited in the file of this patent

UNITED STATES PATENTS 2,934,581    Dessler _____ Apr. 26, 1960

FOREIGN PATENTS 808,007    Great Britain _____ Jan. 28, 1959